United States Patent [19]

Stemporzewski, Jr.

[11] Patent Number: 4,901,195
[45] Date of Patent: Feb. 13, 1990

[54] SELF-PROVING VEHICLE GROUNDING SYSTEM

[75] Inventor: Francis V. Stemporzewski, Jr., Salem, N.H.

[73] Assignee: Scully Signal Company, Wilmington, Mass.

[21] Appl. No.: 213,594

[22] Filed: Jun. 30, 1988

[51] Int. Cl.⁴ ............................ H02H 3/14; H05F 3/00
[52] U.S. Cl. .................................... 361/217; 361/212; 361/215; 340/649; 340/652
[58] Field of Search ......................... 361/212, 215–219; 340/649, 652

[56] References Cited

U.S. PATENT DOCUMENTS

| | | | |
|---|---|---|---|
| 3,343,154 | 9/1967 | Seesselberg | 361/215 |
| 4,225,899 | 9/1980 | Sotiriou | 361/212 |
| 4,691,198 | 9/1987 | Mortensen | 361/215 |

OTHER PUBLICATIONS

*Technical description, Scully Groundhog Self-Proving Vehicle Grounding System*, Scully Electronic System, 70 Industrial Way, Wilmington, Mass. 01887, Mar. 1988.
*Product Literature for the Scully Groundhog Self-Proving Vehicle Grounding System*, Scully Electronic Systems, 70 Industrial Way, Wilmington, Mass. 01887, May 1987.

*Primary Examiner*—Bruce A. Reynolds
*Assistant Examiner*—Leon Fuller
*Attorney, Agent, or Firm*—Wolf, Greenfield & Sacks

[57] ABSTRACT

The invention comprises a self-proving vehicle grounding system for placing the ground of a transportation vehicle at the same voltage as the ground of a loading rack and is intended for use in conjunction with an overfill protection system. The overfill protection system comprises a sensor unit on the vehicle and a base unit on the rack for disabling the loading equipment when the sensor detects overfill. The invention comprises three parts, a controller unit coupled to the filling station ground, a grounding bolt unit which is coupled to the transportation vehicle and a multi-conductor cable. The controller unit comprises a signal generator which produces a first electrical signal and a signal detector which, when it receives a specified second electrical signal at its input, enables the pumping equipment of the filling station. The grounding bolt unit comprises a signal modifier which, when coupled to the signal generator in the controller unit, modifies the first electrical signal to produce the second electrical signal at the input of the signal detector. A single cable provides the necessary connections between the units of the overfill protection system as well as coupling the modifier circuit of the grounding bolt to the signal generator circuit of the controller unit.

12 Claims, 3 Drawing Sheets

SELF-PROVING VEHICLE GROUNDING SYSTEM

FIELD OF THE INVENTION

The invention relates generally to systems for connecting two o more electrically conductive objects to the same electrical ground potential and proving the connection. The invention is particularly adapted to be used for grounding vehicles for transporting highly flammable fluids to the same ground potential as the loading racks from which the fluids are pumped into the vehicles in order to prevent static electric discharges from occurring near the fluid.

BACKGROUND OF THE INVENTION

Transportation of highly flammable fluids requires a high level of caution. One particular problem with which the present invention is concerned is the prevention of static electric discharges near the flammable substance. Differences in voltage potential can exist between different pieces of equipment used in the filling and transportation of these highly flammable substances. For instance, a voltage potential difference may exist between the transport vehicle and the container from which the vehicle is loaded or the equipment used in the filling or discharging processes. For purposes of this discussion, the terms loading rack and filling station are used interchangably and refer to the locations where tank trucks are loaded with flammable fluids. If there is a difference in voltage potential between the vehicle and the loading rack (or filling station), such as might be caused by static electricity, a static electric discharge will occur when a metal part of the vehicle comes in contact with a metal part of the filling station. This is most likely to occur when the nozzle of the hose from the filling station makes contact with the filling nozzle of the vehicle or some similar situation. Static electric discharge at this moment is extremely hazardous since this might ignite the flammable substance and cause an explosion.

The present invention is intended for use at loading racks where Class I, Division 1, groups A, B, C or D hazardous substances, as defined by the National Electrical Code, Article 500, are loaded into tank trucks for transportation. Most gasoline and petroleum products such as diesel fuel, jet fuel and automobile fuel fall into one of these catagories, as do gases such as acetylene and hydrogen.

Many filling stations are therefore equipped with a grounding system in order to prevent static electric discharges of this type. The simplest systems provide a cable which is electrically connected to the filling station at one end and which has a clamp at the other end that can be connected or clamped to a metal part of the vehicle when in the filling station. If there is a voltage potential difference between the filling station and the vehicle, a static electric discharge will occur at the time and place where the cable contact is made and the filling station and vehicle will thereafter remain at the same ground. Even though a static electric discharge still occurs when using the grounding cable, the point of connection to the vehicle can be made at a location remote from the filling nozzle or any other area where the flammable substance may be, thereby eliminating any risk of igniting the flammable substance.

Unfortunately, however, it has been found that the workers at the loading racks or filling stations sometimes neglect to connect the cable to the vehicle. Improvements have been made to the simple grounding cable by adding circuitry that will prevent any filling operations from occurring by cutting off the electricity to or otherwise disabling the pumping systems and other equipment unless a proper ground contact has been established. One method of accomplishing this task is to provide on the clamp which is to be connected to the vehicle, an ohmeter circuit that measures the resistance between the jaws of the clamp. The clamp is provided with insulation material such that there is no metal contact between the two jaws of the clamp when it is fully closed and not attached to anything. The ohmeter circuit is connected to a disabling circuit which disables the filling equipment if the resistance between the jaws exceeds a certain level and enables the equipment when it is below the specified level. The resistance between the jaws of the clamp when it is not connected to metal is theoretically infinite, while the resistance when the clamp is connected to a piece of metal and the jaws both contact the metal is theoretically zero. Therefore, when the clamp is connected to the vehicle, the resistance between the jaws will be below the threshold and the filling equipment will be enabled. Unfortunately, this grounding system can be easily defeated by connecting the clamp to any piece of metal whether it is on the vehicle or not.

Many of the vehicles used for transporting flammable fluids are equipped with overfill protection devices which also must be connected to the loading rack and are intended to disable the pumping equipment when the limit of the vehicles cargo capacity is reached. Overfill protection circuits typically comprise two separate units. The first unit is mounted on the vehicle and comprises sensors within the cargo tank which detect the level of the fluid within the cargo tank and related circuitry for providing the information from the sensors to the second unit. The second unit is mounted on the loading rack and comprises circuitry for disabling the pumping equipment when the sensors indicate that the vehicle is fully loaded. The use of overfill protection circuitry on the vehicle requires a second electrical cable to be connected between the vehicle and the loading rack in order to couple the sensor circuitry to the base unit circuitry. As in the case of the grounding systems of the prior art, the workers at the loading racks frequently neglect to connect the overfill protection circuitry to the loading rack, thereby defeating this safety feature also.

Therefore, it is an object of the present invention to provide an improved self-proving grounding system.

It is a further object of the present invention to provide a self-proving grounding system that will enable the filling equipment if, and only if, the filling equipment and the vehicle are electrically grounded.

It is another object of the present invention to provide a self proving grounding system that can be used in conjunction with an overfill protection system to provide a single cable connection between the loading rack and the vehicle to complete both the overfill protection circuit and provide the self-proving ground.

It is yet another object of the present invention to provide a self proving grounding system which is easy to operate yet not easily defeated.

SUMMARY OF THE INVENTION

The self proving vehicle grounding system of the present invention is intended for use in conjunction with an overfill protection system and comprises three separate parts. The main section is termed the controller and is mounted on the loading rack or filling station and connected to its ground. The second part is the grounding bolt which is grounded to the chassis of the vehicle which it is desired to ground to the filling station. The overfill protection sensor circuitry is also grounded to the chassis. The third part comprises a multi-conductor cable which provides the necessary connections between the first and second parts of the grounding system as well as the first and second parts of an overfill protection system.

The controller section is equipped with a cable which is to be connected to the grounding bolt of a vehicle which is in the filling station. However, instead of being a single conductor, the electrical cable is a multi conductor cable providing a SIGNAL line from the controller to the grounding bolt, a GROUND line and all signal paths necessary for the overfill protection system. The controller section comprises in part a signal generator and a relay. Connected in the grounding bolt, between the terminal for the SIGNAL line and the terminal for the GROUND line, is certain circuitry which, when connected to the cable from the controller becomes part of the signal generator circuitry. When the circuitry contained in the grounding bolt is not made part of the signal generator circuity, the signal generator circuitry produces a signal which turns the relay off. When the multi-conductor cable is connected to the grounding bolt and the circuitry in the grounding bolt becomes part of the signal generator circuitry, a different signal is produced by the signal generator which causes the relay to be turned on. The relay allows the filling station equipment to operate only when the relay is on. Therefore, when the cable from the control unit is hooked up to anything but the grounding bolt, the relay will be turned off thereby disabling filling station equipment.

The grounding bolt and the overfill protection sensor circuitry of the vehicle are electrically coupled to the ground controller and overfill protection base unit associated with the loading rack, respectively, by a single multi-conductor cable connector thereby requiring a single cable hookup to enable both systems.

The controller is equipped with an alternative cable connector. The alternative connector simply provides, within the controller itself the same circuitry that is in the grounding bolt and affords a non-self-proving connection. The alternative connector is provided so that vehicles that are not fitted with the grounding bolt of the present invention can nevertheless be filled at a controller equipped filling station. Although termed non-self-proving, the alternative cable connector is also somewhat self-proving in that the SIGNAL and GROUND lines must somehow be electrically connected at the opposite end of the cable in order for the circuit to be completed. Otherwise, the circuitry which completes the signal generator to turn the relay on will remain open circuited and therefore will not affect the remaining signal generator circuitry, in which case the relay remains off.

DETAILED DESCRIPTION OF THE INVENTION

The invention comprises a grounding cable for placing two electrically conductive objects at the same voltage potential and related circuitry for determining if the proper connection has been made. The invention is particularly adapted to be used at loading racks for transferring highly flammable fluids from stationary tanks to vehicles for transportation.

Figure 1:
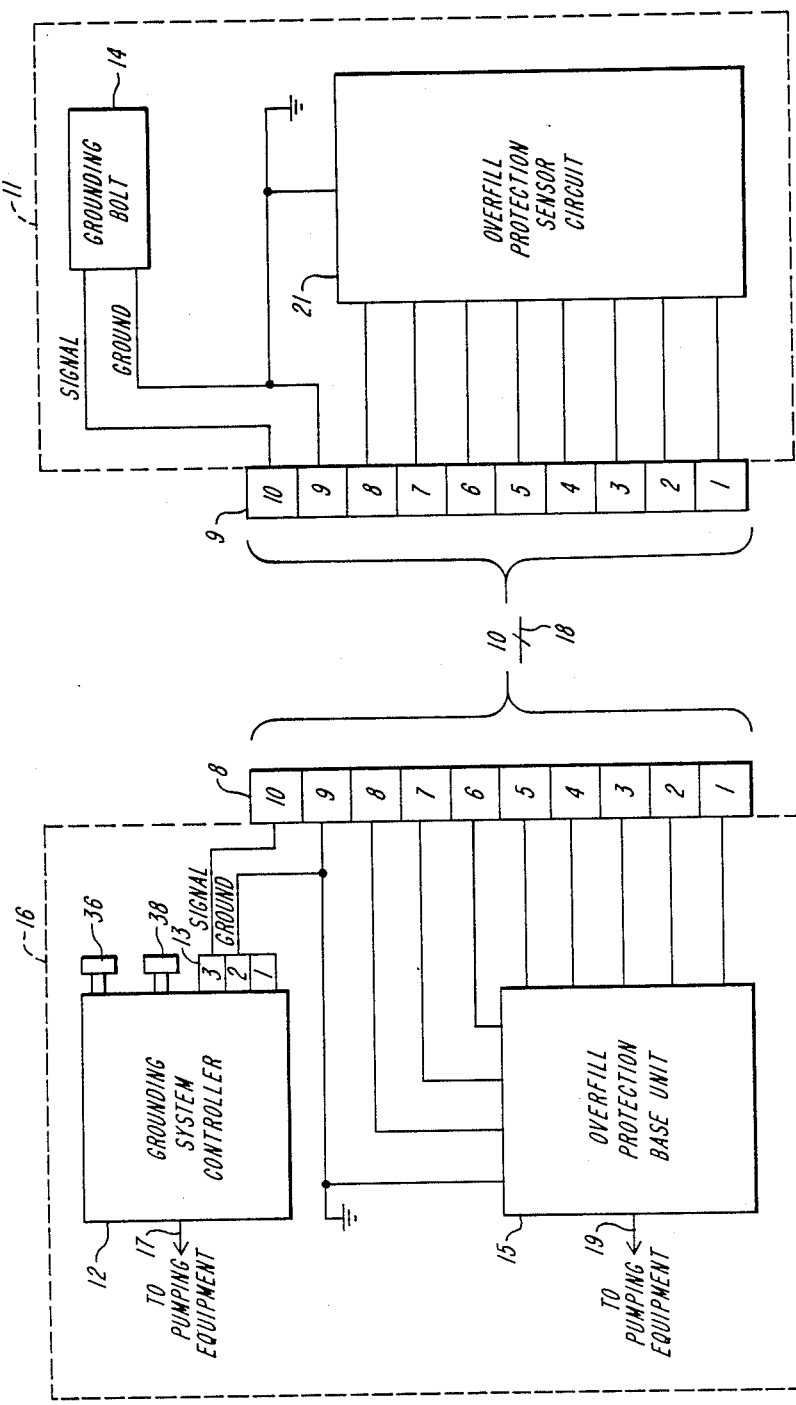
FIG. 1 shows a block diagram broadly illustrating the electrical connections of the present invention.

FIG. 1 shows a block diagram illustrating the electrical connections made between the loading rack 16 and the vehicle 11. At the loading rack 16, the controller 12 of the grounding system of the present invention is connected to the electrical ground of the loading rack at terminal 2 of the terminal strip 13. The overfill protection base unit 15 is also connected to the electrical ground of the loading rack as well as being physically attached thereto. Both the grounding system controller 12 and the overfill protection base unit 15 provide power to the pumping equipment via lines 17 and 19, respectively. As will be discussed in greater detail, the grounding system controller 12 cuts off power to lines 17 unless a proper ground contact is made between the rack 16 and the vehicle 11. Likewise, power to lines 19 is cut off by the overfill protection base unit 15 when overfill protection sensor circuit 21 indicates that the vehicle has reached its cargo capacity.

A vehicle equipped for operation with the present invention comprises a grounding bolt 14 and overfill protection sensors with related circuitry 21. In order for the grounding system and overfill protection system to operate, the grounding system controller 12 must be properly coupled to the grounding bolt 14 and the overfill protection base unit 15 must be properly connected to the overfill protection circuitry 21 of the vehicle. In its preferred embodiment, the present invention utilizes the Scully Thermistor Overfill Protection System offered by Scully Electronics, Inc. of Wilmington, Mass. This particular overfill protection system requires a maximum of eight signal paths plus a ground connection between the base unit 15 and the sensor circuitry 21. As will be explained in greater detail herein, the grounding system requires the connection of only one signal path and a ground between the controller 12 and the grounding bolt 14.

The loading rack 16 and the vehicle 11 are provided with terminal strips 8 and 9, respectively, each having ten terminals, one terminal for the signal path of the grounding system, eight terminals for the signal paths of the overfill protection system and a shared ground line. A cable 18 having terminal strips at either end containing ten terminals has one end connected to terminal strip 8 on rack 16. When a vehicle 11 pulls into the loading rack, the rack operator connects the other end of cable 18 to terminal strip 9 on the vehicle, thereby properly connecting both the grounding system and the overfill protection system with a single cable connection. The actual circuitry of the overfill protection system is not of concern to the present invention and will not be discussed in any further detail.

As can be seen from FIG. 1, the ground connection between the rack and the vehicle is made from the rack, out of terminal 9 on strip 8, through cable 18, into terminal 9 on strip 9 and into the grounding bolt 14. Further, a SIGNAL line connection is made between the controller 12 and the bolt 14 via terminal 10 on strip 8, through cable 18, to terminal 10 on strip 9, and then into the grounding bolt 14.

Terminal strip 9 on the vehicle 18 should be located at a place on the vehicle remote from the filling valves and other equipment which will come in contact with the flammable fluid. When the loading rack and the vehicle are at different potentials and their grounds are connected by cable 18, a static electric discharge will occur Since, however, terminal strip 9 is located at a place remote from the fluid, the static electric discharge will present no danger.

Any vehicle having a grounding bolt such as unit 14 can be loaded at a grounding system controller equipped loading rack 16. As will be discussed in greater detail herein, the controller unit is also equipped to operate in a non-self-proving mode so that vehicles that are not equipped with the grounding bolt 14 can also use the loading rack, if necessary.

Figure 2:
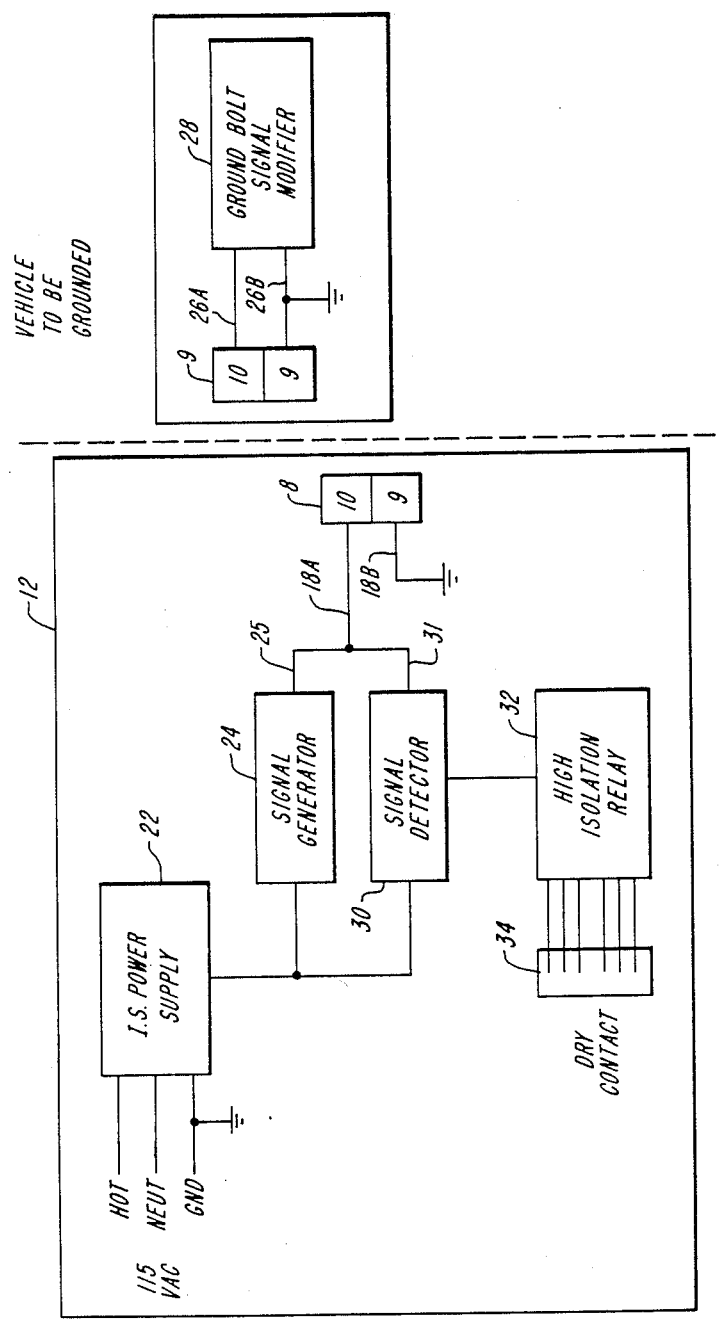
FIG. 2 shows a block diagram of the controller unit and grounding bolt unit of the present invention.

The basic operating principles of the grounding system can be understood in reference to FIG. 2 which shows a block diagram of the circuitry of the grounding system of the present invention. The circuitry in the system is designed to disable loading pumps, valves and other equipment unless the proper ground connection is made between the controller unit 12 and the grounding bolt 14. This system is self-proving in that the controller will cut off the electrical power supply to the loading equipment unless cable 8 is connected between terminal strips 8 and 9. The circuitry of the system consists of five functional blocks as illustrated in FIG. 2. The first block 22 is the power supply section. In a preferred embodiment, the invention is designed to be powered by a normal 115V or 230V alternating current power supply as is typically found in most industrialized nations. Block 22 converts the incoming line voltage (either 115V AC or 130V AC) to 30V AC.

The system is designed for use with Class I, Div. 1, Groups A, B, C, and D hazardous substances as defined in the National Electrical Code, Article 500. According to the National Electrical Code, 30V AC in conjunction with appropriate current limiting circuit design is defined as being intrinsically safe for use with materials in the above mentioned classifications since it is considered to be incapable of causing the ignition of such materials.

Block 24, the second block, comprises a signal generator which supplies a specified signal at its output 25. When the cable 18 is connected to terminal strip 9 of the vehicle 11, the electrical ground 18B of the controller unit 12 will be connected to the electrical ground 26B of the grounding bolt unit 14. Additionally, SIGNAL line 18A of the controller 12 will be connected to line 26A of the grounding bolt. The third block of the system is the signal modifier 28 which is contained within the grounding bolt 14. When cable 18 is connected to terminal strip 9, the signal modifier 28 alters the signal generator signal as it appears at the input 31 of the fourth block in FIG. 2. The fourth block of the circuit is the signal detector 30 which is contained within the controller unit 12. The signal detector 30 examines the signal which it receives at its input 31 and energizes the fifth block, the high isolation relay 32, only when it detects the modified signal which is the result of the coupling of the signal generator 24 and the signal modifier 28 via cable 18. The high isolation relay block 32 which is contained within the controller 12 interrupts the line power of the pumping equipment such that no power reaches the pumping equipment unless the relay is energized. If the signal detector receives an unmodified signal from signal generator 24, or any signal which is modified by anything but the signal modifier 28 in the grounding bolt 14, it will not energize the high isolation relay 32.

In the preferred embodiment, the relay 32 is provided with several form C dry contacts which are actuated when the relay is energized. The pumping equipment is connected to receive its power supply through these contacts. Additionally, the relay is connected to turn on light 36, which is mounted on the enclosure containing the controller unit 12, when the relay is energized and light 38 when the relay is not energized. Preferably, the lights 36 and 38 are green and red, respectively.

When cable 18 is left uncoupled, the connection between SIGNAL line 18A and GROUND line 18B remains open circuited. Therefore, the signal detector 28 will receive only the signal generated by signal generator 24. If lines 18A and 18B of cable 18 are somehow connected to close the circuit between 18A and 18B without using the grounding bolt 14, the signal received by signal detector 30 may be modified but not to the proper form for energizing relay 32.

Figure 3:
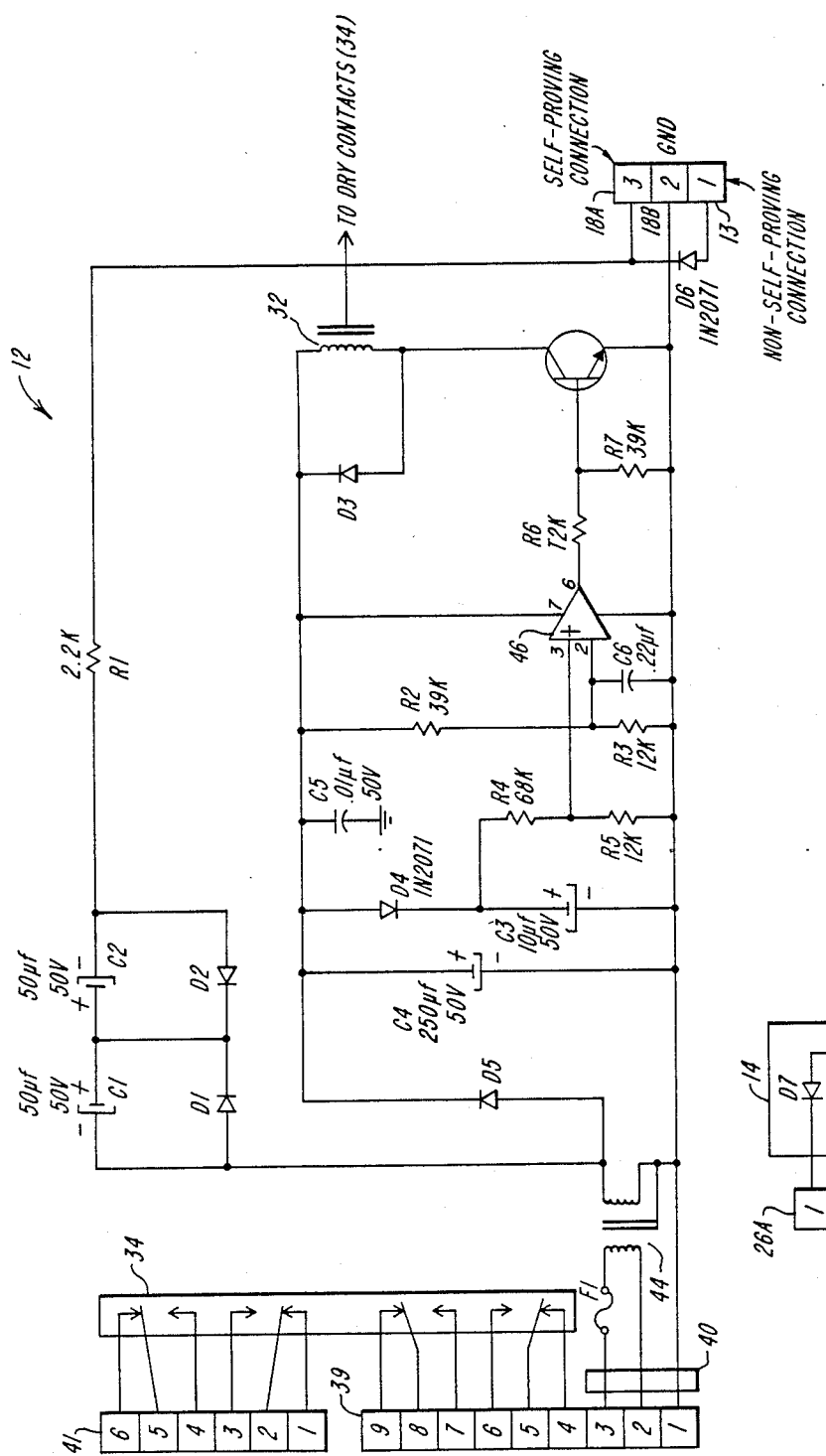
FIG. 3 shows a detailed circuit diagram of the controller unit and the grounding bolt unit of the present invention.

FIG. 3 shows a detailed schematic of the preferred circuitry for the controller unit 12 and the grounding bolt unit 14. The controller unit 12 contains a bracket at one end of the enclosure which provides a terminal strip 39 with nine terminals. Connectors 1,2 and 3 are for 115V or 230V AC power input and the connectors 4-9 for the pumping equipment power supply which are coupled to the dry control contacts 34 of the relay circuit. Wiring to the red and green lamps on the enclosure of the control unit enter the unit on a second terminal strip 41. A third terminal strip 13 provides the SIGNAL line and GROUND line connections to cable 18. The grounding bolt unit 14 contains a terminal strip having two connections, the first connector 26A couples the SIGNAL line 18A to the input of the grounding bolt circuitry, while the second connector 26B couples GROUND line 18B to the ground of the grounding bolt unit 14. As stated previously, these connections, as well as the connections necessary for the operation of the overfill protection system, are carried from the rack 16, out of terminal strip 8, through cable 18, into terminal strip 9 on vehicle 11 and therefrom into the grounding bolt 14 and overfill protection sensor circuity 21.

Power enters the control unit through the first terminal strip 39. A step-down transformer 44 steps the 115V or 230V AC input down to 30V peak AC. Preferably, the transformer also contains a one-time thermal fuse that will open if the transformer overheats. The transformer's secondary voltage winding (i.e. 30 volt side) is half waved rectified and filtered by diode D5, capacitor C4 and capacitor C5 to provide power to the operational amplifier 46, and relay 32. A voltage divider and filter, made up of resistors R2 and R3, and capacitor C6, provides a 7 volt reference voltage to the inverting input cf the operational amplifier 46. The output of the operational amplifier 46 drives the base of transistor Q1 through a current limiting resistor R6. Resistor R7 bleeds off residual base voltage on transistor Q1 when the output of the amplifier is low. Transistor Q1 is configured as a common emitter saturated switch that drives relay 32. Diode D3 protects the collector emitter junction of transistor Q1 from transients generated in the coil of relay 32 when the relay is turned off.

Since resistors R2 and R3, and capacitor C6 provide a 7 volt reference voltage at the inverting input of the operational amplifier 46, the output of operational amplifier 46 will change states (i.e. negative to positive) when the voltage at the non-inverting input crosses the 7 volt threshold. Resistors R4 and R5 comprise a voltage divider that defines the threshold voltage that is required to be placed on capacitor C3 to provide the 7 volt threshold level at the non-inverting input. The voltage at the non-inverting input is equal to the voltage across R5. Choosing R4 as 68K ohms and R5 as 12K ohms, this threshold voltage across C3 is set at 46.6 volts. This threshold was selected to be higher than any voltage that is present at the secondary coil of the transformer to guard against a component failure that can cause the system to fail unsafe.

A charge pumping circuit is used to obtain the 46.6 volts across capacitor C3 that causes the system to operate. This charge pump is made up of a non-polar capacitor configuration comprising diodes D1 and D2, capacitors C1 and C2 and diode D7 Diode D7 is not contained within the controller 12 as is the other circuitry, but is in the grounding bolt. It completes the charge pumping circuit when the cable 18 is connected between terminal strips 8 and 9. The charge pumping circuit charges capacitor C3 on positive half cycles of the transformer secondary coil voltage and diode D7 in the grounding bolt charges capacitor C3 on negative half cycles. The voltage that charges C3 during the second (and subsequent) positive half cycles is 30 volts from the secondary coil of the transformer plus the approximately 30 volts of charge from the non-polar capacitor configuration of the charge pumping circuit. Capacitor C3, therefore, becomes charged with approximately 60 volts when diode D7 is included in the circuit. Since 60 volts exceeds the 46.6 volt threshold voltage on capacitor C3, this causes the operational amplifier 46 to drive a positive current at its output thereby driving transistor Q1 to energize relay 32. If the grounding bolt is removed from the circuit, the charge pump will no longer operate and the charge on capacitor C3 will be discharge by resistors R4 and R5 to approximately 30 volts. Since this voltage is less than the threshold voltage of 46.6, volts, the output of the operational amplifier will change state and the relay 32 will no longer be energized.

Resistor R1 is included in the charge pumping circuit to limit the maximum current that is available at the output line 18A to intrinsically safe levels for Class I, Division 1, Groups A, B, C and D of the National Electrical Code.

When terminals 9 and 10 on terminal strip 8 are connected to terminals 2 and 3 respectively, on the connector strip 13, the circuit will operate as described above. However, when a vehicle not equipped with the grounding bolt requires filling at a controller equipped filling station, the self-proving circuitry can be defeated by connecting the signal output line 18A between terminal 1 on strip 13 and terminal 10 of strip 8 rather than terminal 3 of strip 13 and terminal 10 of strip 8. As shown in FIG. 3, connecting cable 18A to terminal 1 defeats the self-proving connection by providing diode D6 to take the place of diode D7 in the grounding bolt. If lines 18A and 18B are connected together by any means, it will close the circuit between terminals 1 and 2, and diode D6 will be factored into the circuit.

It should be noted that even when the alternate connection is made, the vehicle grounding system is still somewhat self-proving in that the wires 18A and 18B of cable 18 must be connected to some metal object in order to close the circuit which includes diode D6 in the charge pumping circuit. In this manner, vehicles equipped with standard brass or stainless steel ground bolts that are commercially available can be filled at a loading rack equipped with the ground system controller 12 of the present invention.

Having thus described one particular embodiment, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is intended to be exemplary only, and not limiting. The invention is limited only as defined in the following claims and equivalents thereto.

What is claimed is:

1. A self-proving grounding system for placing the electrical ground voltage of first and second electrically conductive objects at the same voltage for use in conjunction with an overfill protection system comprising an overfill protection base unit associated with the first object and an overfill protection sensor circuit associated with the second object, said overfill protection controller and sensor circuit requiring electrical connection therebetween, comprising:

a ground controller unit having a ground and adapted to be electrically grounded to the first object, comprising:
   (a) means for generating a first electrical signal; and
   (b) means for detecting a second electrical signal, coupled to the means for generating;

a grounding bolt unit having a ground and adapted to be electrically grounded to the second object, comprising:
   (a) means for modifying the first electrical signal when coupled to the controller unit to produce the second electrical signal electrically; and a single multi-conductor cable for electrically coupling the means for generating a first electrical signal of the ground controller unit to the means for modifying the first electrical signal of the grounding bolt unit and further coupling the overfill protection controller to the overfill protection sensor circuit including an electrical ground connection.

2. A self-proving electrical grounding apparatus as set forth in claim 1 wherein the ground controller unit, grounding bolt unit, overfill protection base unit and overfill protection sensor circuit each further comprise multiple conductors for carrying electrical signals therebetween, the system further comprising:

a first connector means having multiple input terminals for engaging the conductors from the ground controller and the overfill protection base unit and an output for coupling to a first end of the multi-conductor cable; and a connector means strip having an input for coupling to a second end of the multi-conductor cable and multiple output terminals for engaging the conductors from the grounding bolt unit and the overfill protection sensor circuitry.

3. A self proving electrical grounding apparatus as set forth in claim 2 further comprising:

means for coupling electrically powered equipment to the grounding system; and means for selectively enabling the electrically powered equipment which is coupled to the grounding system when the second signal is provided to the mean for detecting.

4. A self-proving electrical grounding apparatus as set forth in claim 3 wherein said means for enabling comprises:

a relay which is energized when the second signal is provided to the means for detecting; and electrical contacts that are closed when the relay is energized.

5. A self-proving electrical grounding apparatus as set forth in claim 4 further comprising means for indicating when the relay is energized.

6. A self proving electrical grounding apparatus as set forth in claim 5 wherein said means for indicating comprises a light which is turned on when the relay is energized.

7. A system for grounding a vehicle to the same ground voltage potential as a loading rack and disabling any loading operations from occurring if the ground is not properly established or if the vehicle is fully loaded, comprising:

a ground controller unit electrically coupled to the ground of the loading rack, which comprises;
  (a) means for generating a first electrical signal,
  (b) means for detecting a second electrical signal, coupled to the means for generating;

a grounding bolt unit electrically coupled to the vehicle, which comprises;
  (a) means for modifying the first electrical signal when electrically coupled to the controller unit so as to provide the second electrical signal at the input of the means for detecting.

an overfill protection sensor circuit unit associated with the vehicle having an electrical ground for sensing when the vehicle is fully loaded and generating a FULL signal indicating the condition of being fully loaded;

an overfill protection base unit associated with the loading rack for disabling the loading equipment when the FULL signal is generated; and means for electrically coupling the means for generating a first electrical signal to the means for modifying the first electrical signal and for coupling the FULL signal to the overfill protection base unit.

8. A system as set forth in claim 7 wherein the means for electrically coupling comprises a single multi-conductor cable.

9. A system as set forth in claim 8 wherein the means for electrically coupling further comprises a first terminal strip having multiple input terminals for electrically engaging the ground controller and the overfill protection base unit and an output for coupling to a first end of the multi conductor cable; and a second terminal strip having an input for coupling to a second end of the multi-conductor cable and multiple output terminals for electrically engaging to the grounding bolt and overfill protection sensor circuit.

10. A system as set forth in claim 9 wherein the ground of the ground controller is coupled to the ground of the overfill protection base unit to provide a first combined ground line which is provided to the first terminal strip and further wherein the ground of the grounding bolt is coupled to the ground of the overfill protection sensor circuit to provide a second combined ground line which is provided to the second terminal strip.

11. A self-proving grounding system for coupling the electrical ground of a loading rack to the electrical ground of a transport vehicle and preventing the loading of fluid from the loading rack to the vehicle except when their grounds are coupled together and the vehicle is not fully loaded, comprising:

a ground controller unit adapted to be electrically grounded to the loading rack, comprising:
  (a) a first pair of terminals for coupling to an alternating current voltage source;
  (b) a transformer having first and second windings with the first winding coupled to said first pair of terminals for stepping the alternating current voltage to 30 volts AC at the second winding;
  (c) a first voltage divider coupled to the second winding of the transformer;
  (d) an operational amplifier having an inverting input coupled to the voltage divider;
  (e) a charge pumping circuit having an input coupled to the second winding of the transformer;
  (f) a charge and hold capacitor coupled to the charge pumping circuit so as to be charged by the charge pumping circuit to a second voltage which is less than the first voltage;
  (g) a second voltage divider having an input coupled to the charge and hold capacitor and an output coupled to a non-inverting input of the operational amplifier;
  (h) a transistor configured as a common emitter saturated switch having a base junction coupled to the output of the operational amplifier;
  (i) a relay having an input coupled to the collector junction of the transistor;
  (j) one or more dry contacts coupled to the output of the relay and enabled when the relay is energized;
  (k) first connector means coupled to the dry contacts for allowing connection of the dry contacts to external electrically powered equipment;
  (l) second connector means having first and second terminals, the first terminal coupled to the output of the charge pumping circuit and the second terminal coupled to the ground of the controller unit;

a bolt unit adapted to be electrically grounded to the transport vehicle, comprising:
  (a) a modifier diode having an anode and a cathode;
  (b) third connector means having third and fourth terminals, the third terminal coupled to the cathode of the modifier diode and the fourth terminal coupled to the anode of the modifier diode and the ground of the transport vehicle;

an overfill protection sensor circuit unit associated with the vehicle and having an electrical ground for sensing when the vehicle is fully loaded and generating a FULL signal indicating the condition of being fully loaded;

an overfill protection base unit associated with the loading rack for disabling the loading equipment when the FULL signal is generated; and a cable for coupling the first and third terminals together and the second and fourth terminals together so as to couple the modifier diode to the charge pumping circuit so as to cause the charge pumping circuit to charge the capacitor to a third voltage which is greater than the first and second voltages, when the multi conductor cable is connected and further coupling the FULL signal of the overfill protection sensor circuit to the overfill protection base unit.

12. A self-proving electrical grounding apparatus as set forth in claim 11 wherein the charge pumping circuit comprises:

a first capacitor having an input coupled to the input of the charge pumping circuit and an output;

a first diode having an anode and a cathode, the anode coupled to the input of the first capacitor and the cathode coupled to the output of the first capacitor;

a second capacitor having an input coupled to the output of the first capacitor and an output coupled to the output of the charge pumping circuit; and a second diode having an anode and a cathode, the anode coupled to the output of the second capacitor and the cathode coupled to the input of the second capacitor.

* * * * *